(12) United States Patent
Katsuta et al.

(10) Patent No.: US 9,904,094 B2
(45) Date of Patent: Feb. 27, 2018

(54) LIQUID CRYSTAL DISPLAY

(71) Applicant: Sharp Kabushiki Kaisha, Sakai, Osaka (JP)

(72) Inventors: Shohei Katsuta, Sakai (JP); Tsuyoshi Maeda, Sakai (JP); Emi Yamamoto, Sakai (JP); Yasushi Asaoka, Sakai (JP); Hideomi Yui, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/304,111

(22) PCT Filed: Apr. 16, 2015

(86) PCT No.: PCT/JP2015/061679
§ 371 (c)(1),
(2) Date: Oct. 14, 2016

(87) PCT Pub. No.: WO2015/159943
PCT Pub. Date: Oct. 22, 2015

(65) Prior Publication Data
US 2017/0038634 A1  Feb. 9, 2017

(30) Foreign Application Priority Data

Apr. 17, 2014  (JP) ................................. 2014-085643

(51) Int. Cl.
*G02F 1/1335* (2006.01)
*F21V 8/00* (2006.01)

(52) U.S. Cl.
CPC ..... *G02F 1/133504* (2013.01); *G02B 6/0046* (2013.01); *G02F 1/133528* (2013.01); *G02F 1/133553* (2013.01); *G02B 6/0051* (2013.01); *G02B 6/0053* (2013.01); *G02F 1/133512* (2013.01); *G02F 2001/133562* (2013.01)

(58) Field of Classification Search
CPC ........................ G02F 1/133504; G02B 6/0046
See application file for complete search history.

(56) References Cited

FOREIGN PATENT DOCUMENTS

WO    2012/081410 A1    6/2012

*Primary Examiner* — Thanh-Nhan P Nguyen
(74) *Attorney, Agent, or Firm* — Keating & Bennett, LLP

(57) ABSTRACT

A liquid crystal display (1) includes a liquid crystal panel (4), a backlight (2), and a light-diffusing member (7). There exist azimuths in which a transmittance of the liquid crystal panel (4) and a luminance of the backlight (2) are higher than a transmittance and a luminance in a direction of a normal. The azimuth in which the transmittance of the liquid crystal panel (4) is higher coincides with the azimuth in which the luminance of the backlight (2) is higher.

7 Claims, 9 Drawing Sheets

LIQUID CRYSTAL DISPLAY

TECHNICAL FIELD

The present invention relates to a liquid crystal display.

The present application claims priority to Japanese Priority Patent Application 2014-085643 filed in the Japan Patent Office on Apr. 17, 2014, the entire contents of which are hereby incorporated by reference.

BACKGROUND ART

Liquid crystal displays are in widespread use as portable electronic devices such as cellular phones, or displays of, for example, televisions or personal computers. Typically, liquid crystal displays have excellent visibility from the front but have a property of a narrow viewing angle.

Accordingly, there are various ways to increase the viewing angle of conventional liquid crystal displays. One of the ways is to dispose a light-diffusing member on a viewing side of a liquid crystal panel (display body) and diffuse light emitted from the viewing side of the liquid crystal panel by using the light-diffusing member.

For example, there is a disclosure of a light-diffusing member including a transparent base material, light-diffusing portions that are formed on a surface of the transparent base material and each have a tapered side surface, and light-shielding portions formed in areas of the surface of the transparent base material other than areas in which the light-diffusing member is formed (see, for example, PTL 1). The light-diffusing portions are formed in a manner in which ultraviolet light (UV light) is emitted from a transparent base material side and the light-shielding portions are caused to function as a mask to pattern a transparent negative resist.

CITATION LIST

Patent Literature

PTL 1: International Publication No. WO2012/081410

SUMMARY OF INVENTION

Technical Problem

The light-diffusing member more remarkably improves the viewing angle property with respect to a direction in which image quality is poor (for example, a distinct vision direction of a TN liquid crystal panel) when the strength $F_R$ of light (reflected light) that is reflected from the light-diffusing member and emitted toward the outer surface side of the light-diffusing member after being emitted from the liquid crystal panel toward the light-diffusing member is larger than the strength $F_S$ of light (transmitted light) that is transmitted through the light-diffusing member after being emitted from the liquid crystal panel toward the light-diffusing member.

It is thought that increasing the ratio of fine air layers (voids formed between the light-diffusing portions) contained in the light-diffusing member is a method for increasing the strength of the reflected light. However, an increase in the ratio of the air layers decreases the front transmittance (transmittance at which light is transmitted to the outer surface side of the light-diffusing member) of the light-diffusing member.

An aspect of the present invention is suggested in view of the existing circumstances, and an object of the present invention is to provide a liquid crystal display with an improved viewing angle property without increasing the ratio of the air layers contained in the light-diffusing member.

Solution to Problem

To achieve the above object, the following measure is applied as an aspect of the present invention.

(1) A liquid crystal display according to the aspect of the present invention includes a liquid crystal panel including a pair of substrates, a liquid crystal layer interposed between the substrates, and a pair of polarizing plates disposed on a light-incident side and a light-exit side of the liquid crystal layer, an illumination device that is disposed on the light-incident side of the liquid crystal panel and emits light toward the liquid crystal panel, and a light-diffusing member that is disposed on the light-exit side of the liquid crystal panel and causes light emitted from the liquid crystal panel to diffuse in an azimuth-angle direction viewed from a direction of a normal of the liquid crystal panel. The light-diffusing member includes an optically transparent base material, plural light-shielding layers formed on a surface of the optically transparent base material, and a light-diffusing portion formed in an area of the surface of the optically transparent base material other than areas in which the light-shielding layers are formed. The light-diffusing portion includes a light-exit end surface in contact with the base material, a light-incident end surface that faces the light-exit end surface and has an area larger than an area of the light-exit end surface, and a reflective surface that is in contact with the light-exit end surface and the light-incident end surface and reflects light incident on the light-incident end surface. A height of the light-diffusing portion from the light-incident end surface to the light-exit end surface is larger than a thickness of each of the light-shielding layers. There exist azimuths in which a transmittance of the liquid crystal panel and a luminance of the illumination device are higher than a transmittance and a luminance in the direction of the normal. The azimuth in which the transmittance of the liquid crystal panel is higher coincides with the azimuth in which the luminance of the illumination device is higher.

(2) In the liquid crystal display described in (1), the liquid crystal panel is preferably of a TN type.

(3) In the liquid crystal display described in (1), the liquid crystal panel is preferably of a VA type.

(4) In the liquid crystal display described in any one of (1) to (3), a light source forming the illumination device is preferably disposed along one side surface of the liquid crystal panel, and an azimuth from the one side surface of the liquid crystal panel to another side surface of the liquid crystal panel facing the one side surface preferably coincides with the azimuth in which the transmittance of the liquid crystal panel is higher.

(5) In the liquid crystal display described in any one of (1) to (3), light sources forming the illumination device are preferably disposed on one side surface of the liquid crystal panel and another side surface of the liquid crystal panel facing the one side surface, and outputs of the light sources disposed on the one side surface preferably differ from outputs of the light sources disposed on the other side surface.

(6) In the liquid crystal display described in (5), the number of the light sources disposed on the one side surface preferably differs from the number of the light sources disposed on the other side surface.

(7) In the liquid crystal display described in any one of (1) to (6), the illumination device preferably includes a light-guiding body that guides light emitted from the light source, and the light-guiding body is preferably formed in a wedge shape such that a thickness of the light-guiding body gradually decreases along a surface of the liquid crystal panel on the light-incident side.

Advantageous Effects of Invention

According to the aspect of the present invention, a liquid crystal display with an improved viewing angle property can be provided without increasing the ratio of the air layers contained in the light-diffusing member.

DESCRIPTION OF EMBODIMENTS

Figure 1:
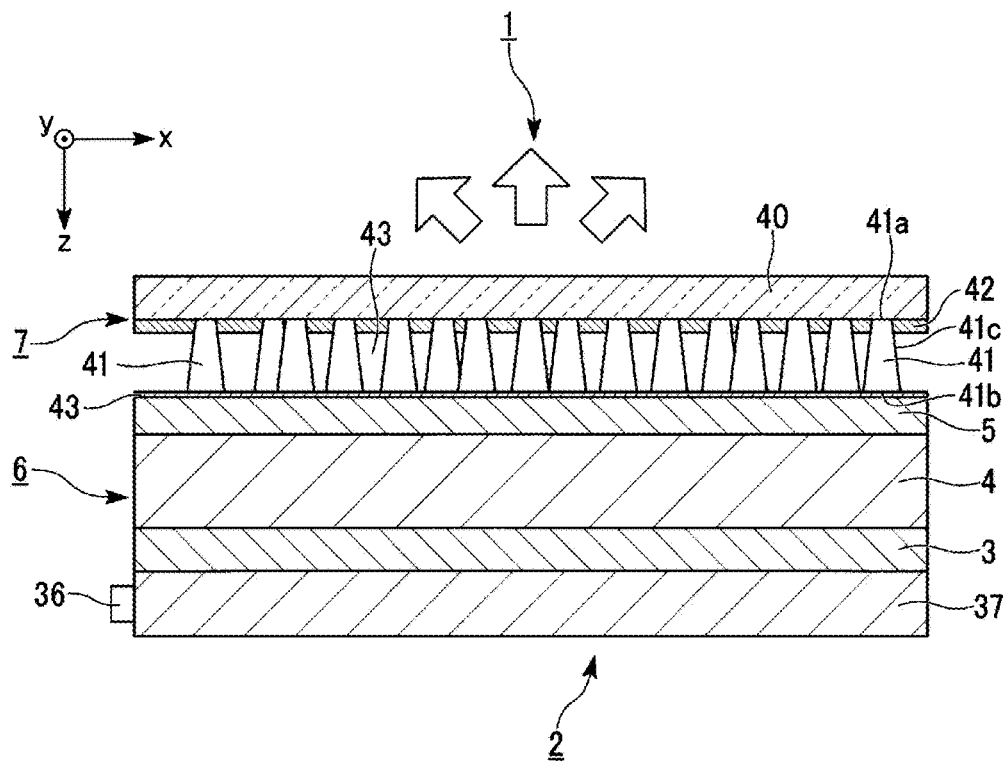
FIG. 1 is a sectional view of a liquid crystal display according to a first embodiment of the present invention.

Embodiments of the present invention will hereinafter be described in detail with reference to the drawings.

In the drawings, components may not be drawn to scale to make the components easy to see.

First Embodiment (Liquid Crystal Display)

A liquid crystal display 1 illustrated in FIG. 1 will be described as a first embodiment of the present invention.

FIG. 1 is a sectional diagram illustrating a schematic structure of the liquid crystal display 1.

As illustrated in FIG. 1, the liquid crystal display 1 is substantially formed of a backlight 2, a first polarizing plate 3, a liquid crystal panel 4, a second polarizing plate 5, and a light-diffusing member 7. The backlight 2, the first polarizing plate 3, the liquid crystal panel 4, and the second polarizing plate 5 constitute a liquid crystal display body 6.

In the following description, a side on which the light-diffusing member 7 is disposed is referred to as a viewing side, and a side on which the backlight 2 is disposed is referred to as a back face side. In the drawings, the x-axis represents the horizontal direction of the screen of the liquid crystal panel 4, the y-axis represents the vertical direction of the screen of the liquid crystal panel 4, and the z-axis represents the thickness direction of the liquid crystal panel 4.

For example, the backlight 2 is substantially formed of a light source 36 composed of, for example, a light-emitting diode or a cold-cathode tube, and a light-guiding body 37 that directs light emitted from the light source 36 toward the liquid crystal panel 4 by using internal reflection of the light. The light source 36 is disposed on an end surface of the light-guiding body 37 (which is referred to as an edge light type). The light source 36 may be disposed right below the light-guiding body 37 (which is referred to as a direct light type). The light-guiding body 37 has a function of guiding the light emitted from the light source 36 to the liquid crystal panel 4.

For example, a resin material such as an acrylic resin is used as the material of the light-guiding body 37.

Figure 2:
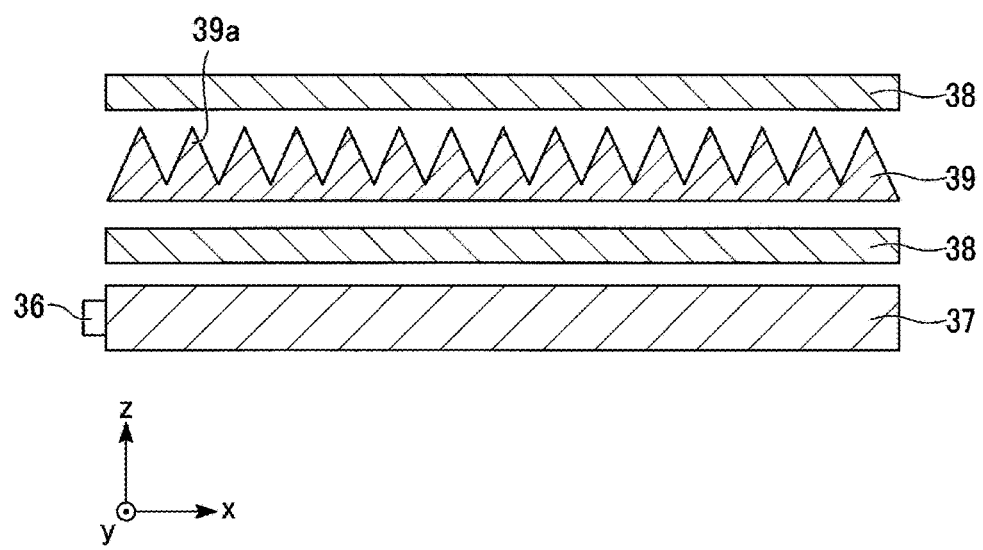
FIG. 2 is a sectional diagram illustrating a schematic structure of a backlight included in the liquid crystal display according to the first embodiment of the present invention.

Light incident on the end surface of the light-guiding body 37 from the light source 36 propagates through the inside of the light-guiding body 37 while being totally reflected and is emitted from the upper surface (light emitting surface) of the light-guiding body 37 with a substantially uniform strength. As illustrated in FIG. 2, diffusion sheets 38 and a prism sheet 39 are disposed on and above the upper surface of the light-guiding body 37. Specifically, the diffusion sheet 38, the prism sheet 39, and the diffusion sheet 38 are stacked and arranged in this order on the upper surface of the light-guiding body 37. In the prism sheet 39, protruding portions 39a are continuously formed on the side of the liquid crystal panel 4.

The light emitted from the upper surface of the light-guiding body 37 is scattered by the diffusion sheets, concentrated by the prism sheet, substantially collimated, and emitted. For example, BEF (trade name) made by Sumitomo 3M Limited is used for the prism sheet.

In the embodiment, a backlight (low-directivity backlight) that controls the direction in which light is emitted to reduce the directivity to a certain degree is preferably used as the backlight 2. However, use of the backlight 2 with directivity (directivity backlight) is not prohibited.

The first polarizing plate 3 functions as a polarizer and is disposed between the backlight 2 and the liquid crystal panel 4. The second polarizing plate 5, on the other hand, functions as an analyzer and is disposed between the liquid crystal panel 4 and the light-diffusing member 7.

The liquid crystal panel 4 is, for example, a transparent liquid crystal panel. The liquid crystal panel 4 is not limited to a transparent liquid crystal panel and may be a semi-transparent (transparent and reflective) liquid crystal panel or a reflective liquid crystal panel. The liquid crystal panel 4 is an active matrix-type liquid crystal panel and includes a thin film transistor (TFT) as a switching element that switches the action of pixels.

The liquid crystal panel 4 is not limited to an active matrix-type liquid crystal panel and may be a simple matrix-type liquid crystal panel including no switching element.

The light-diffusing member 7 diffuses light emitted from the viewing side of the liquid crystal panel 4, thereby increasing the viewing angle (viewing-angle increasing film), and is disposed on the viewing side (on the second polarizing plate 5) of the liquid crystal panel 4.

In the liquid crystal display 1 thus configured, the liquid crystal panel 4 modulates light emitted from the backlight 2, and a predetermined image or character is displayed by using the modulated light. When the light emitted from the liquid crystal panel 4 is transmitted through and emitted from the light-diffusing member 7, the angular distribution of the emitted light becomes wider than before the light is incident on the light-diffusing member 7. This enables an observer to view the display at a wide viewing angle.

(Liquid Crystal Panel)

Figure 3:
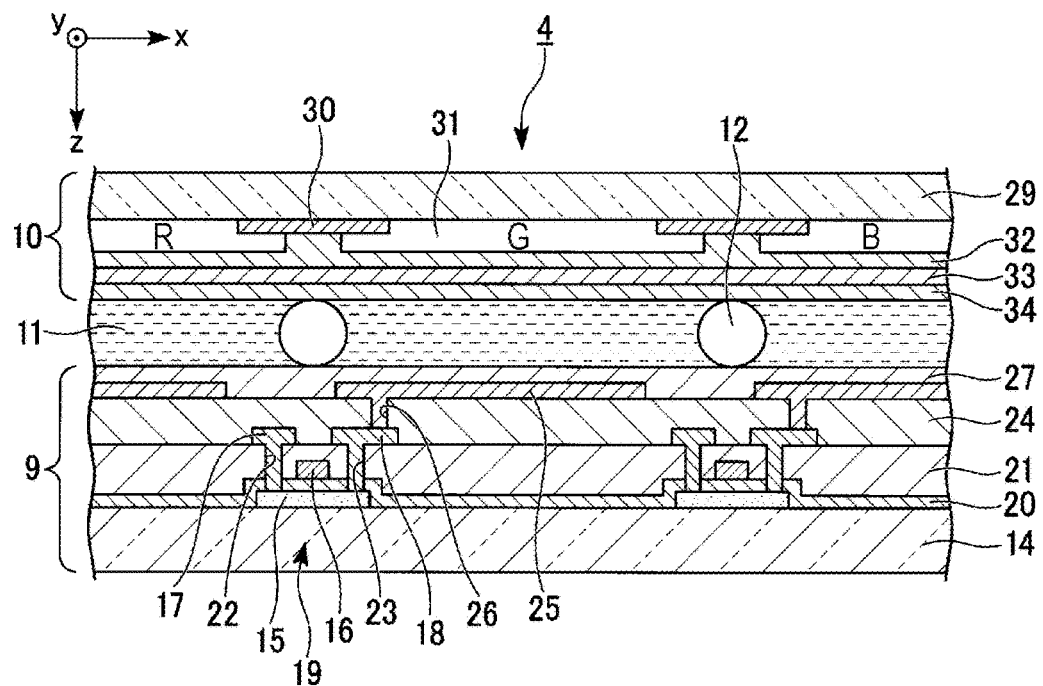
FIG. 3 is a sectional diagram illustrating a schematic structure of a liquid crystal panel included in the liquid crystal display according to the first embodiment of the present invention.

A specific structure of the liquid crystal panel 4 will now be described with reference to FIG. 3. FIG. 3 is a sectional diagram illustrating a schematic structure of the liquid crystal panel 4.

As illustrated in FIG. 3, the liquid crystal panel 4 includes a TFT substrate 9 (also referred to as an element substrate), a color filter substrate 10 (also referred to as a facing substrate) that is disposed such that the color filter substrate 10 faces the TFT substrate 9, and a liquid crystal layer 11 that is disposed between the TFT substrate 9 and the color filter substrate 10.

The liquid crystal layer 11 is interposed between the TFT substrate 9 and the color filter substrate 10 in a manner in which a gap between the TFT substrate 9 and the color filter substrate 10 is surrounded and sealed by a sealing material (not illustrated), and a liquid crystal is injected therebetween. Spherical spacers 12 for maintaining a constant gap between the TFT substrate 9 and the color filter substrate 10 are disposed therebetween.

The liquid crystal panel 4 according to the embodiment displays, for example, in a VA (Vertical Alignment) mode, and a vertical alignment liquid crystal whose dielectric anisotropy is negative is used for the liquid crystal layer 11.

The display mode is not limited to the VA mode and may be, for example, a TN (Twisted Nematic) mode, a STN (Super Twisted Nematic) mode, or an IPS (In-Plane Switching) mode.

Pixels (not illustrated), which are minimum unit areas of display, are disposed on the TFT substrate 9 in a matrix arrangement. In the TFT substrate 9, source bus lines (not illustrated) are formed so as to extend in parallel with each other, gate bus lines (not illustrated) extend in parallel with each other and are formed so as to be perpendicular to the source bus lines. Accordingly, the source bus lines and the gate bus lines are formed on the TFT substrate 9 in a lattice pattern, and each of rectangular areas divided by the adjoining source bus lines and the adjoining gate bus lines corresponds to a pixel. The source bus lines are connected to source electrodes of the TFT, described later, and the gate bus lines are connected to gate electrodes of the TFT.

A TFT 19 including semiconductor layers 15, gate electrodes 16, source electrodes 17, drain electrodes 18, and so on is formed on a surface of a transparent substrate 14 included in the TFT substrate 9 on the side of the liquid crystal layer 11.

For example, a glass substrate may be used as the transparent substrate 14. The semiconductor layers 15 made of, for example, a semiconductor material such as CGS (Continuous Grain Silicon), LPS (Low-temperature Poly-Silicon), or α-Si (Amorphous Silicon) are formed on the transparent substrate 14. A gate insulating layer 20 is formed on the transparent substrate 14 so as to cover the semiconductor layers 15. For example, a silicon oxide film, a silicon nitride film, or a laminated film thereof is used as the material of the gate insulating layer 20. The gate electrodes 16 are formed on the gate insulating layer 20 so as to face the semiconductor layers 15. For example, a laminated film of W (tungsten) and TaN (tantalum nitride), Mo (molybdenum), Ti (titanium), or Al (aluminum) is used as the material of the gate electrodes 16.

A first interlayer insulating layer 21 is formed on the gate insulating layer 20 so as to cover the gate electrodes 16. For example, a silicon oxide film, a silicon nitride film, or a laminated film thereof is used as the material of the first interlayer insulating layer 21. The source electrodes 17 and the drain electrodes 18 are formed on the first interlayer insulating layer 21. The source electrodes 17 are connected to source areas of the semiconductor layers 15 via contact holes 22 extending through the first interlayer insulating layer 21 and the gate insulating layer 20. Similarly, the drain electrodes 18 are connected to drain areas of the semiconductor layers 15 via contact holes 23 extending through the first interlayer insulating layer 21 and the gate insulating layer 20. The same conductive material as the above material of the gate electrodes 16 is used as the material of the source electrodes 17 and the drain electrodes 18. A second interlayer insulating layer 24 is formed on the first interlayer insulating layer 21 so as to cover the source electrodes 17 and the drain electrodes 18. The same material as the above material of the first interlayer insulating layer 21 or an organic insulating material is used as the material of the second interlayer insulating layer 24.

Pixel electrodes 25 are formed on the second interlayer insulating layer 24. The pixel electrodes 25 are connected to the drain electrodes 18 via contact holes 26 extending through the second interlayer insulating layer 24. That is, the pixel electrodes 25 are connected to the drain areas of the semiconductor layers 15 with the drain electrodes 18 functioning as relaying electrodes. For example, a transparent, conductive material such as ITO (Indium Tin Oxide) or IZO (Indium Zinc Oxide) is used as the material of the pixel electrodes 25. With this structure, scanning signals are sent via the gate bus lines, and, when the TFT 19 is on, image signals sent to the source electrodes 17 via the source bus lines are sent to the pixel electrodes 25 via the semiconductor layers 15 and the drain electrodes 18. An alignment layer 27 is formed on the entire surface of the second interlayer insulating layer 24 so as to cover the pixel electrodes 25. The alignment layer 27 has the ability to cause the alignment of the liquid crystal molecules forming the liquid crystal layer 11 to be vertical alignment. The form of the TFT may be a top-gate-type TFT illustrated in FIG. 3 or a bottom-gate-type TFT.

Black matrixes 30, color filters 31, a flattening layer 32, a facing electrode 33, and an alignment layer 34 are formed in this order on the surface of a transparent substrate 29 included in the color filter substrate 10 on the side of the liquid crystal layer 11. The black matrixes 30 have a function of blocking light from being transmitted through areas between pixels and are formed of a metal such as Cr (chromium) or a multilayer film of Cr and oxide Cr, or a photoresist in which carbon particles are dispersed in a photosensitive resin. The color filters 31 contain pigments of colors of red (R), green (G), and blue (B) and are disposed such that one of the color filters 31 of R, G, and B faces one of the pixel electrodes 25 on the TFT substrate 9. The color filters 31 may contain colors other than three colors of R, G, and B. The flattening layer 32 is formed of an insulating film covering the black matrixes 30 and the color filters 31 and has a function of reducing steps produced by the black matrixes 30 and the color filters 31 for flattening. The facing electrode 33 is formed on the flattening layer 32. The same transparent, conductive material as the material of the pixel electrodes 25 is used as the material of the facing electrode 33. The alignment layer 34, which has the ability for the vertical alignment, is formed on the entire surface of the facing electrode 33.

In a process of manufacturing the liquid crystal display body 6, the TFT substrate 9 and the color filter substrate 10 are first manufactured and then disposed such that the surface of the TFT substrate 9 on which the TFT 19 is formed faces the surface of the color filter substrate 10 on which the color filters 31 are formed. The TFT substrate 9 and the color filter substrate 10 are bonded to each other with a sealing member interposed therebetween. Then, a liquid crystal is injected into a space surrounded by the TFT substrate 9, the color filter substrate 10, and the sealing member. The first polarizing plate 3 and the second polarizing plate 5 are bonded by using, for example, an optical adhesive to both surfaces of the liquid crystal panel 4 thus manufactured. Through the above processes, the liquid crystal display body 6 is manufactured.

The description of methods of manufacturing the TFT substrate 9 and the color filter substrate 10 is omitted, because known methods are used.

(Light-Diffusing Member)

Figure 4:
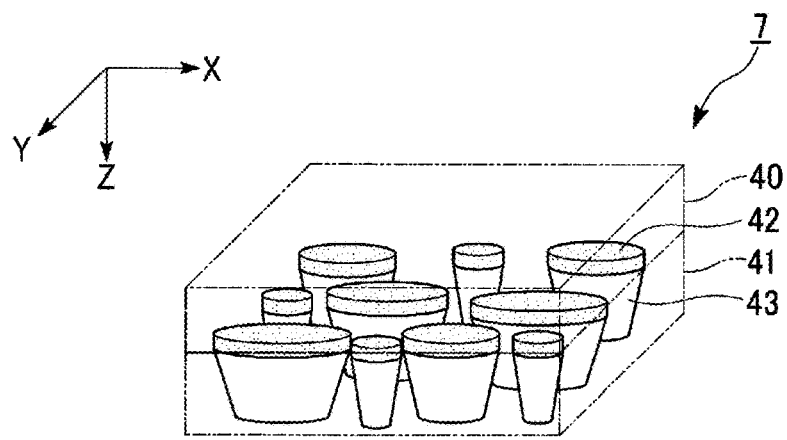
FIG. 4 is a perspective diagram illustrating a schematic structure of a light-diffusing member included in the liquid crystal display according to the first embodiment of the present invention.
Figure 5:
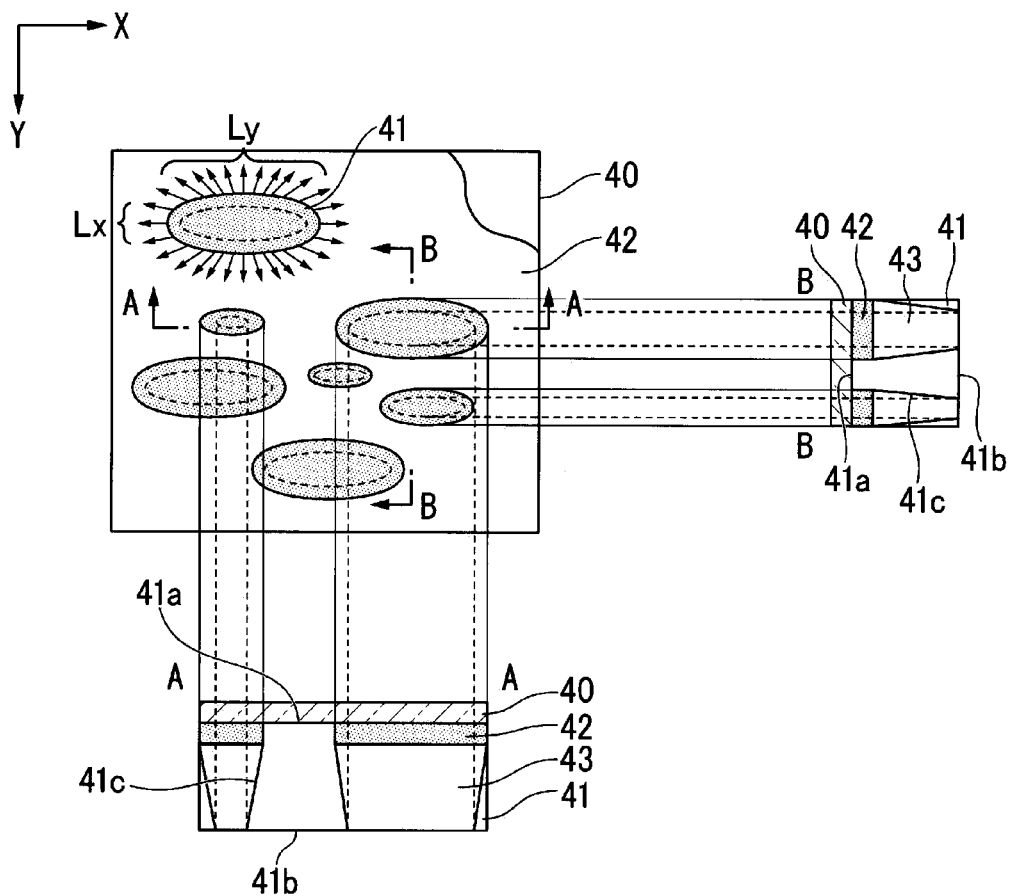
FIG. 5 is a schematic configuration view of the light-diffusing member included in the liquid crystal display according to the first embodiment of the present invention.

A specific structure of the light-diffusing member 7 will now be described with reference to FIG. 4 and FIG. 5. FIG. 4 is a perspective view of the light-diffusing member 7 viewed from the viewing side. FIG. 5 is a schematic diagram illustrating the structure of the light-diffusing member 7. FIG. 5 illustrates a plan view of the light-diffusing member 7 at the upper left part. FIG. 5 illustrates, at the lower left part, a sectional view of the plan view, illustrated at the upper left part, taken along line A-A. FIG. 5 illustrates, at the upper right part, a sectional view of the plan view, illustrated at the upper left part, taken along line B-B.

The light-diffusing member 7 includes an optically transparent base material 40, light-diffusing portions 41 formed on a surface of the base material 40 (surface on the opposite side of the viewing side), and light-shielding layers 42 (light absorbing portions) and has a structure where the light-shielding layers 42 are separately disposed in areas within the area in which the light-diffusing portions 41 are formed.

For example, a transparent resin film such as a triacetylcellulose (TAC) film, a polyethylene terephthalate (PET) film, a polycarbonate (PC) film, a polyethylene naphthalate (PEN) film, or a polyether sulphone (PES) film is preferably used for the base material 40. The base material 40 is used as a foundation when the light-shielding layers 42 and the light-diffusing portions 41 are formed later in a subsequently mentioned manufacturing process, and needs to have a heat resistance and a mechanical strength during a heat treatment in the manufacturing process. Accordingly, a glass base material, for example, may be used as the base material 40 instead of a resin base material. The thickness of the base material 40 is preferably decreased to such an extent that the heat resistance and the mechanical strength are not decreased. The reason is that a blur in display is more likely to occur as the thickness of the base material 40 increases. In the embodiment, an example of the base material 40 is a transparent resin film having a thickness of 100 µm. The total light transmittance of the base material 40 is preferably 90% or more according to the standard of JIS K7361-1. When the total light transmittance is 90% or more, a sufficient transparency is ensured.

The light-diffusing portions 41 are composed of, for example, an organic material that is optically transparent and photosensitive such as an acrylic resin or an epoxy resin. The total light transmittance of the light-diffusing portions 41 is preferably 90% or more according to the standard of JIS K7361-1. When the total light transmittance is 90% or more, a sufficient transparency is ensured.

The light-diffusing portions 41 each have a light-exit end surface 41*a*, a light-incident end surface 41*b*, and a side surface 41*c*. The light-exit end surface 41*a* is a surface in contact with the base material 40. The light-incident end surface 41*b* is a surface facing the light-exit end surface 41*a*. The side surface 41*c* is a surface formed between the light-exit end surface 41*a* and the light-incident end surface 41*b*. The area of the light-incident end surface 41 is larger than the area of the light-exit end surface 41*a*. Specifically, the area of the horizontal section of the light-diffusing portions 41 gradually increases from the side adjacent to the base material 40 to the side remote from the base material 40. Accordingly, the side surface 41*c* of the light-diffusing portions 41 is an inclined surface reversely tapered from the side adjacent to the base material 40 to the side remote from the base material 40.

The light-diffusing portions 41 are portions that serve to cause light to be transmitted through the light-diffusing member 7. Specifically, light incident on the light-incident end surface 41*b* of each light-diffusing portion 41 is totally reflected from the side surface 41*c* of the light-diffusing portion 41 and guided in a state where the light is substantially confined in the inside of the light-diffusing portion 41 so as to be is emitted from the light-exit end surface 41*a*.

An angle (referred to as a taper angle below) formed by the side surface 41*c* with respect to the light-incident end surface 41*b* is preferably no less than 75° and no more than 85°. In the embodiment, the taper angle of the side surface 41*c* is 85°. The taper angle of the side surface 41*c*, however, is not particularly limited provided that the angle enables the incident light to be sufficiently diffused when the light is emitted from the light-diffusing member 7. In the embodiment, the taper angle of the side surface 41c is constant.

The height from the light-incident end surface 41b of the light-diffusing portions 41 to the light-exit end surface 41a is determined to be larger than the thickness of each light-shielding layer 42. In the case of the embodiment, the thickness of each light-shielding layer 42 is, for example, about 150 nm. The height from the light-incident end surface 41b of the light-diffusing portions 41 to the light-exit end surface 41a is, for example, about 20 μm.

The light-shielding layers 42 are randomly located when viewed from the direction of the normal of a main surface of the base material 40. The light-shielding layers 42 are composed of, for example, a light-absorbing organic material that is photosensitive such as a black resin containing carbon, a black resist, or black ink. Other than these, a metallic film such as a Cr (chromium) film or a multilayer film of Cr and oxide Cr may be used.

The light-diffusing member 7 includes hollow portions 43. The hollow portions 43 are portions surrounded by the side surfaces 41c of the light-diffusing portions 41 and the light-shielding layers 42. There is air in the hollow portions 43. The light-diffusing portions 41 are disposed at portions other than the hollow portions 43 so as to be continuous.

The refractive index of the base material 40 is preferably substantially equal to the refractive index of the light-diffusing portions 41. The reason is as follows. For example, the case where the refractive index of the base material 40 differs significantly from the refractive index of the light-diffusing portions 41 will be considered. In this case, when light incident on the light-incident end surface 41b is emitted from the light-exit end surface 41a, unnecessary refraction and reflection of the light may occur at interfaces between the light-diffusing portions 41 and the base material 40. In this case, there is a provability that a failure occurs; for example, a desirable viewing angle is not achieved, or the amount of the emitted light is decreased.

In the case of the embodiment, air is interposed in the hollow portions 43 (outside of the light-diffusing portions 41). Accordingly, in the case where the light-diffusing portions 41 are formed of, for example, a transparent acrylic resin, the side surface 41c of the light-diffusing portions 41 is an interface between the transparent acrylic resin and air. The hollow portions 43 may be filled with another low-refractive-index material. However, the difference in the refractive index at interfaces between the inside and outside of the light-diffusing portions 41 is at its maximum in the case where air exists at the outside, not in the case where any low-refractive-index material exists at the outside.

For this reason, according to Snell's law, a critical angle in the structure of the embodiment is at its minimum, and the range of an incident angle when light is totally reflected from the side surface 41c of the light-diffusing portions 41 is the widest. Consequently, the loss of light is further suppressed, and a high luminance can be achieved.

The light-shielding layers 42 are disposed on a surface of the base material 40 so as to be interspersed. The planar shape of the light-shielding layers 42 when viewed from the direction of the normal of the base material 40 is a long and thin ellipse. Portions below the light-shielding layers 42 correspond to the hollow portions 43 in the form of an elliptical truncated cone.

The light-shielding layers 42 each have a major axis and a minor axis. The major axis described herein is an axis having the longest length of the planar shape of the light-shielding layers 42 when viewed from the direction of the normal of the base material 40. The minor axis is an axis having the shortest length of the planar shape of the light-shielding layers 42 when viewed from the direction of the normal of the base material 40. In the light-diffusing member 7 according to the embodiment, the light-shielding layers 42 have substantially the same ratio of the length of the minor axis to the length of the major axis.

In the light-diffusing member 7 according to the embodiment, the direction of the major axis (also referred to as the direction of the major axis of the light-shielding layers below) of the elliptical planar shape of the light-shielding layers 42 substantially coincides with the X-direction. The direction of the minor axis (also referred to as the direction of the minor axis of the light-shielding layers below) of the elliptical planar shape of the light-shielding layers 42 substantially coincides with the Y-direction. In view of this, considering the direction of the side surface 41c of the light-diffusing portions 41, the ratio of the side surface 41c of the light-diffusing portions 41 extending in the X-direction is larger than the ratio of the side surface 41c of the light-diffusing portions 41 extending in the Y-direction. Accordingly, the amount of light Ly that is reflected from the side surface 41c extending in the X-direction and diffused in the Y-direction is larger than the amount of light Lx that is reflected from the side surface 41c extending in the Y-direction and diffused in the X-direction. Accordingly, an azimuth-angle direction in which the diffusibility of the light-diffusing member 7 is highest is the Y-direction, which is the direction of the minor axis of the light-shielding layers 42.

Examples of the planar shape of the light-shielding layers 42 may include a circle, a polygon, and a semicircle.

The light-shielding layers 42 may be formed so as to have an overlapping portion.

As illustrated in FIG. 1, the light-diffusing member 7 thus configured is disposed on the viewing side of the liquid crystal display body 6.

Figure 6:
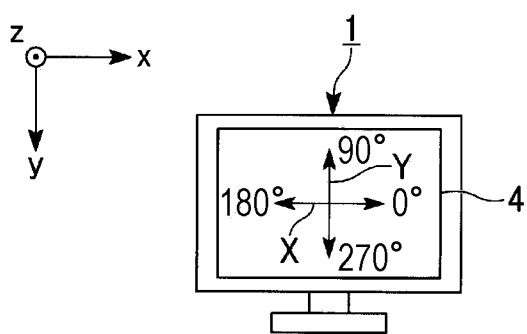
FIG. 6 is a schematic diagram illustrating the front shape of the liquid crystal panel of the liquid crystal display according to the first embodiment of the present invention.

As illustrated in FIG. 6, the front shape of the screen of the liquid crystal panel 4 included in the liquid crystal display 1 is a rectangle that is long in the left-right direction (oblong). The horizontal direction of the screen is the direction of an azimuth angle φ of 0°-180°. Briefly, the direction of an azimuth angle φ of 0°-180° is the left-right direction (X-direction) along an axis parallel with the ground. The vertical direction of the screen, on the other hand, is the direction of an azimuth angle φ of 90°-270°. Briefly, the direction of an azimuth angle φ of 90°-270° is the vertical direction (Y-direction) along an axis perpendicular to the ground. FIG. 6 schematically illustrates the horizontal direction and vertical direction of the screen of the liquid crystal panel 4 included in the liquid crystal display 1 that are denoted by the azimuth angle φ.

In the case where the liquid crystal panel 4 is of a TN type, for example, the liquid crystal panel 4 is disposed such that the plus direction (upward in the page) of the Y-direction illustrated in FIG. 6 is a reverse distinct vision direction, and the minus direction (downward in the page) of the Y-direction is a distinct vision direction.

The liquid crystal display 1 enables the viewing angle to be increased while diffusing light emitted from the viewing side of the liquid crystal display body 6 in a manner in which the light-diffusing member 7 is disposed on the viewing side of the liquid crystal display body 6.

In the liquid crystal display 1, there exist azimuths in which the transmittance of the liquid crystal panel 4 and the luminance of the backlight 2 (illumination device) are higher than the transmittance and the luminance in the direction of the normal, and the azimuth in which the transmittance of the liquid crystal panel 4 is higher coincides with the azimuth in which the luminance of the backlight 2 is higher.

The azimuth (high luminance azimuth) in which the luminance of the backlight 2 is higher and the azimuth (high transmittance azimuth) in which the transmittance of the liquid crystal panel 4 is higher will now be described with reference to FIG. 7 and FIG. 8.

Figure 7:
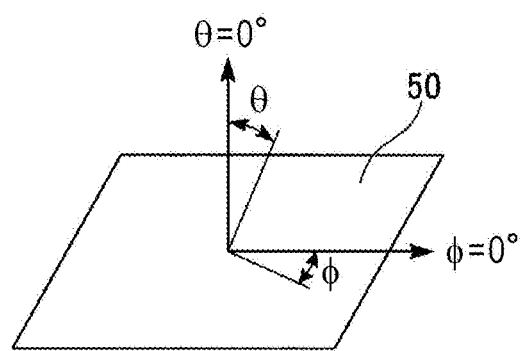
FIG. 7 is a diagram illustrating azimuths in which a luminance is high and a transmittance is high in the liquid crystal panel of the liquid crystal display according to the first embodiment of the present invention.

As illustrated in FIG. 7, for example, a direction perpendicular to a plane is defined as θ=0°. A straight line intersecting the plane in the direction of θ=0° is a perpendicular. An angle formed by the perpendicular is referred to as a polar angle θ.

The azimuth angle ϕ is defined in a plane 50. For example, a direction parallel with a direction (longitudinal direction or lateral direction of the plane 50) of the plane 50 is defined as ϕ=0°.

The high luminance azimuth of the backlight 2 is first measured.

For example, the upper surface (surface on the side of the liquid crystal panel 4) of the backlight 2 is regarded as the plane 50, and the luminance L(θ, ϕ) of the backlight 2 at an azimuth (θ, ϕ) within the range of 0°≤θ≤90° and 0°≤ϕ≤360° is measured, an azimuth (θ$_0$, ϕ$_0$) at which the luminance is highest is specified, and the azimuth ϕ$_0$ is regarded as the high luminance azimuth of the backlight 2.

A conoscope is used to measure the luminance. Examples of the conoscope include EzContrast made by ELDIM company.

Figure 8:
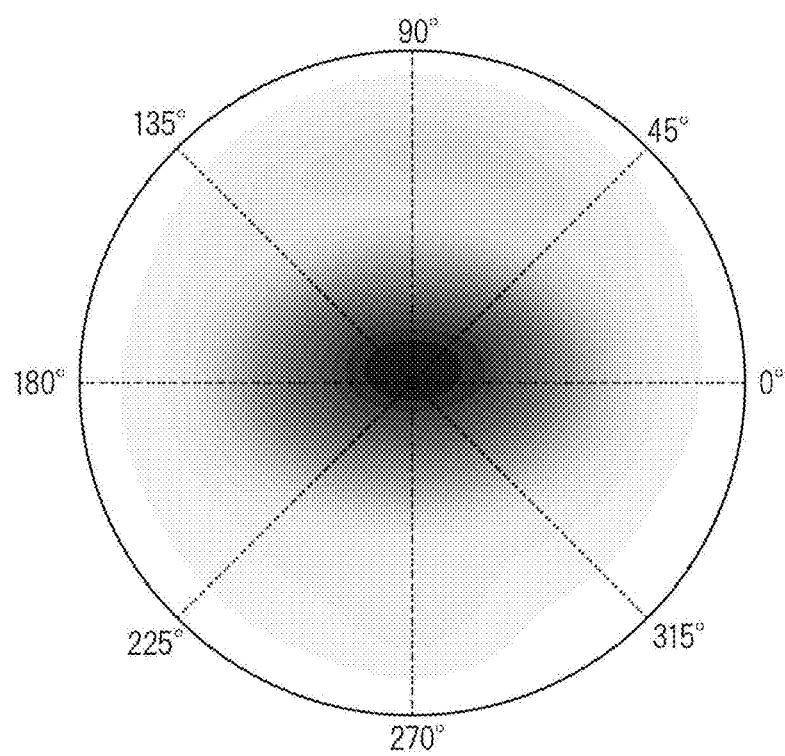
FIG. 8 is a diagram illustrating a result of measurement of the luminance of the backlight.

FIG. 8 is a diagram illustrating an exemplary measurement result of the luminance of the backlight 2 with a conoscope.

The measurement result of the luminance is that the luminance is highest when (θ, ϕ)=(10°, 90°). That is, the high luminance azimuth of the backlight 2 is ϕ=90°.

The high transmittance azimuth of the liquid crystal panel 4 is subsequently measured.

The liquid crystal panel 4 is disposed on the backlight 2 (on the upper surface side), and light is emitted from the backlight 2 toward the liquid crystal panel 4.

The upper surface (surface on the side of the light-diffusing member 7) of the liquid crystal panel 4 is regarded as the plane 50, and the luminance L'(θ', ϕ') of the liquid crystal panel 4 at an azimuth (θ', ϕ') within the range of 0°≤θ≤90° and 0°≤ϕ≤360° is measured.

Then, L'(θ', ϕ')/L(θ, ϕ)=T(θ, ϕ) is calculated, and L(θ, ϕ) and L'(θ', ϕ') are specified such that T(θ, ϕ) is largest. For example, when the azimuth at which T(θ, ϕ) is largest is (θ$_0$, ϕ$_0$), the azimuth ϕ$_0$ is defined as the high transmittance azimuth of the liquid crystal panel 4.

In the liquid crystal display 1, the high luminance azimuth of the backlight 2 and the high transmittance azimuth of the liquid crystal panel 4 that are thus obtained coincide with each other.

The light-diffusing member 7 reflects part of the incident light, causes the other light to be transmitted therethrough, and thereby mixes light emitted from the liquid crystal panel 4, so that differences in characteristics of the light in each direction are reduced.

In TN liquid crystal panels, there exists a direction in which a variation in color is peculiarly large such as the distinct vision direction. When the rubbing direction of TN liquid crystal panels on the color filter substrate side is from a direction of ϕ=225° to a direction of ϕ=45°, the rubbing direction on the TFT substrate side is from a direction of ϕ=135° to a direction of ϕ=315°, and the twisting direction of liquid crystal is 90° in a counterclockwise direction, the variation in color is peculiarly large particularly in a direction of ϕ=270°. In general, this is referred to as the distinct vision direction. In the case where it is desirable for the variation in color in the distinct vision direction to be reduced, when the strength $F_R$ of light (reflected light) that is reflected from the light-diffusing member 7 and emitted toward the outer surface side of the light-diffusing member 7 after being emitted from the liquid crystal panel 4 toward the light-diffusing member 7 is larger than the strength $F_S$ of light (transmitted light) that is transmitted through the light-diffusing member 7 after being emitted from the liquid crystal panel 4 toward the light-diffusing member 7, the variation in color in the distinct vision direction is more remarkably reduced. That is, the color of mixed light of the light transmitted through the light-diffusing member 7 and the light reflected from the light-diffusing member 7 is close to the color of the light reflected from the light-diffusing member 7.

The luminance Y'(θ$_0$, ϕ$_0$) of the mixed light of the transmitted light and the reflected light is expressed by the following formula (1).

[Formula 1]

$$Y'(\theta_0,\phi_0)=f_T(\theta_0,\phi_0)\cdot Y(\theta_0,\phi_0)+\int_\theta\int_\phi f_R(\theta_0,\phi_0,\theta,\phi)\cdot Y(\theta,\phi)\,d\phi d\theta \quad (1)$$

In the formula (1), θ represents the polar angle, ϕ represents the azimuth angle, Y'(θ$_0$, ϕ$_0$) represents the luminance of the mixed light of the transmitted light and the reflected light, Y(θ$_0$, ϕ$_0$) represents the luminance of light transmitted through the light-diffusing member at the azimuth (θ$_0$, ϕ$_0$), Y(θ, ϕ) represents the luminance of the liquid crystal display at the azimuth (θ, ϕ), $f_T(\theta, \phi)$ represents a ratio (function) at which light emitted from the liquid crystal display at the azimuth (θ, ϕ) is transmitted through the light-diffusing member, and $f_R(\theta_0, \phi_0, \theta, \phi)$ represents a ratio (function) at which the light emitted from the liquid crystal display at the azimuth (θ, ϕ) is reflected from the light-diffusing member at the azimuth (θ$_0$, ϕ$_0$).

The variation in color in the distinct vision direction is reduced in a manner in which a ratio of the second term to the first term is increased (the value of the second term is higher than the value of the first term) in the formula (1). An example of a method for increasing the ratio of the second term to the first term is to make the value of the luminance Y(θ, ϕ) of the liquid crystal display larger than the value of the luminance Y(θ$_0$, ϕ$_0$) of the light transmitted through the liquid crystal display.

Figure 9:
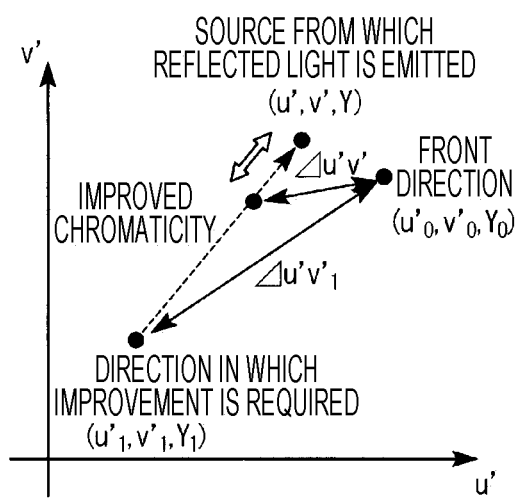
FIG. 9 is a diagram illustrating the fact that the color of mixed light of light transmitted through the light-diffusing member and light reflected from the light-diffusing member is close to the color of the light reflected from the light-diffusing member.

In this manner, as illustrated in FIG. 9, the color of the mixed light of the light transmitted through the light-diffusing member 7 and the light reflected from the light-diffusing member 7 is close to the color of the light reflected from the light-diffusing member 7.

Suppose that (u'$_1$, v'$_1$, Y$_1$) is displayed in the direction in which the variation in color is large as a result of being affected by the viewing angle property of the liquid crystal panel, when an image in which a u'-v' chromaticity coordinate and a luminance are expressed by (u'$_0$, v'$_0$, Y$_0$) is displayed in the front direction of the display.

For convenience of description, suppose that light emitted in one direction is reflected from the diffusing member 7 in the direction in which the variation in color is large. When the u'-v' chromaticity coordinate and luminance of the reflected light is (u', v', Y), the u'-v' chromaticity after mixing is on a line connecting two points of (u'$_1$, v'$_1$) and (u', v') in a u'-v' chromaticity space.

The larger the luminance Y with respect to $Y_1$, the closer the chromaticity is to (u', v'). Consequently, a difference $\Delta u'v'$ from a coordinate ($u'_0$, $v'_0$) in the front direction decreases, and accordingly, the luminance Y of the reflected light is preferably larger than the original luminance $Y_1$.

Figure 10:
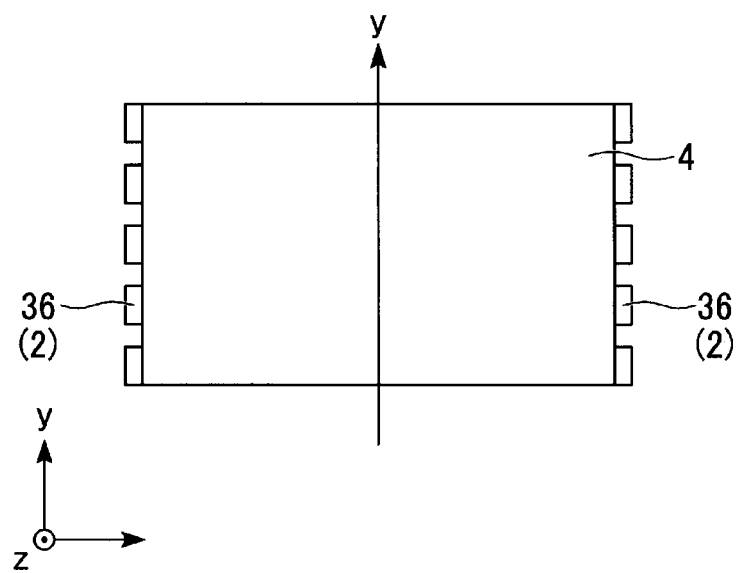
FIG. 10 is a schematic diagram illustrating the arrangement of light sources and a liquid crystal panel in a conventional liquid crystal display.

As illustrated in FIG. 2, the backlight 2 is substantially formed of, for example, the light source 36 and the light-guiding body 37. As illustrated in FIG. 10, the light sources 36 are conventionally disposed on the right and left of the liquid crystal panel 4 (both side surfaces in the right and left direction when the distinct vision direction is the downward direction in the case where the liquid crystal panel 4 is of a TN type).

Light that is emitted from the light sources 36 and incident on the light-guiding body 37 advances while being repeatedly reflected within the light-guiding body 37 and exits from the light-guiding body 37 when the light hits scattering dots, not illustrated, that are dotted on a surface of the light-guiding body 37. The light is incident on the liquid crystal panel 4.

Figure 11:
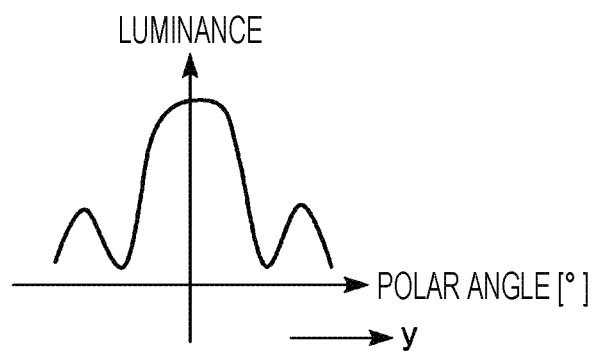
FIG. 11 is a diagram illustrating the polar angle-luminance property of the liquid crystal panel in the vertical direction (Y-direction) in the conventional liquid crystal display.

In the case where the light sources 36 are thus disposed on the right and left of the liquid crystal panel 4, as illustrated in FIG. 11, the polar angle-luminance property of the liquid crystal panel 4 in the vertical direction (Y-direction) is symmetrical with respect to the front, that is, a polar angle of $\theta=0°$.

Figure 12:
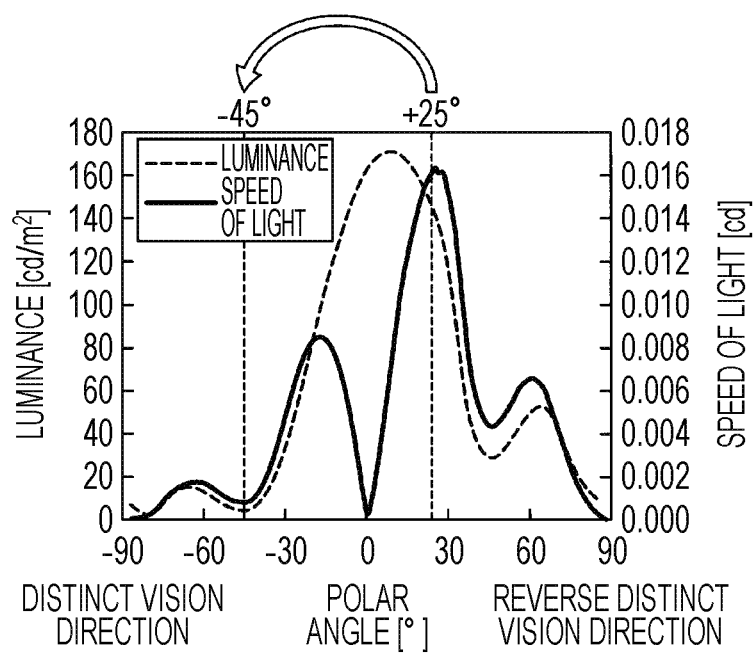
FIG. 12 is a diagram illustrating an isoluminance curve in the case where a combination of the liquid crystal panel and a backlight is used, and the polar angle-luminance property of the liquid crystal panel in the vertical direction (Y-direction) in the conventional liquid crystal display.

In the case where the liquid crystal panel 4 is of a TN type, the isoluminance curve when a combination of the liquid crystal panel 4 and the backlight 2 is used, and the polar angle-luminance property of the liquid crystal panel 4 in the vertical direction (Y-direction) are illustrated in FIG. 12.

The strength of light reflected from the light-diffusing member 7 is preferably higher than the strength of light transmitted through the light-diffusing member 7, as described above. Accordingly, in order to reflect light at a polar angle of $\theta=+25°$, at which the luminous flux is largest in the reverse distinct vision direction, toward a polar angle of $\theta=-45°$, at which the luminous flux is lowest in the distinct vision direction, it is necessary for angles formed by the hollow portions 43 and light-diffusing portions 41 of the light-diffusing member 7 to be, for example, 85°.

Figure 13:
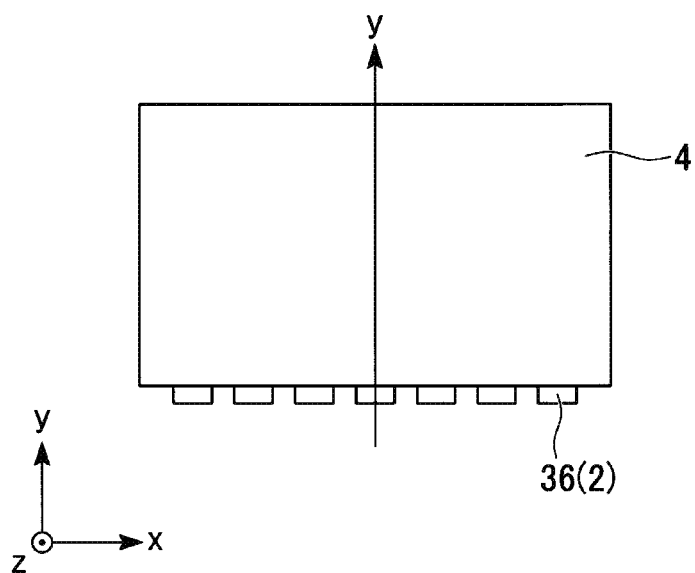
FIG. 13 is a schematic diagram illustrating the arrangement of light sources and the liquid crystal panel in the liquid crystal display according to the first embodiment of the present invention.

In relation to this, in the liquid crystal display described in the embodiment, as illustrated in FIG. 13, the light sources 36 are disposed on the lower side of the liquid crystal panel 4 (lower side when the distinct vision direction is the downward direction in the case where the liquid crystal panel 4 is of a TN type).

Figure 14:
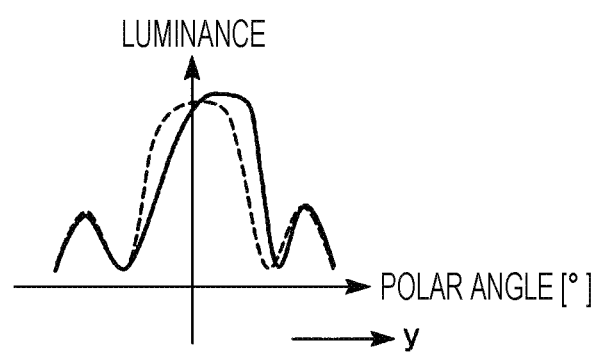
FIG. 14 is a diagram illustrating the polar angle-luminance property of the liquid crystal panel in the vertical direction (Y-direction) in the liquid crystal display according to the first embodiment of the present invention.

In the case where the light sources 36 are thus disposed on the lower side of the liquid crystal panel 4, as illustrated in FIG. 14, the polar angle-luminance property of the liquid crystal panel 4 in the vertical direction (Y-direction) is asymmetrical with respect to the vertical direction. Comparing the luminance at the same polar angle, the luminance in the upward direction of the liquid crystal panel 4 (luminance in the upward direction of the light sources 36) is high. The reason is as follows: the scattering dots patterning on the light-guiding body 37 of the backlight 2 do not cause full scatter, and a light distribution property after scatter depends on the incident direction to a certain degree; accordingly, the luminance on the opposite side of positions at which the light sources 36 are disposed (direction of the upper side on the opposite side of the lower side on which the light sources 36 are disposed) is high. That is, the luminance of the liquid crystal panel 4 increases along the azimuth from the lower side to the upper side in the vertical direction thereof. The luminance of the light sources 36 increases along the azimuth from the lower side to the upper side in the vertical direction of the liquid crystal panel 4.

Figure 15:
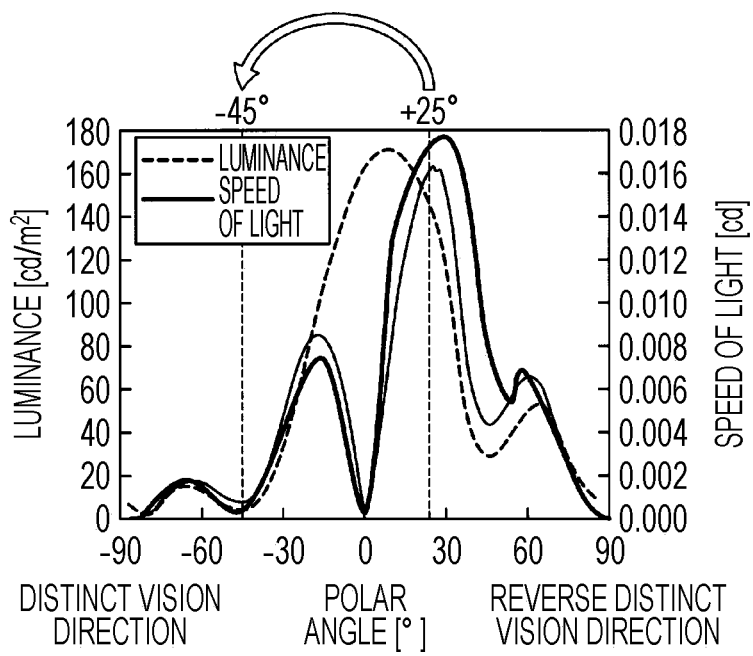
FIG. 15 is a diagram illustrating the isoluminance curve in the case where a combination of the liquid crystal panel and the backlight is used, and the polar angle-luminance property of the liquid crystal panel in the vertical direction (Y-direction) in the liquid crystal display according to the first embodiment of the present invention.

In the case where the liquid crystal panel 4 is of a TN type, the isoluminance curve when a combination of the liquid crystal panel 4 and the backlight 2 is used, and the polar angle-luminance property of the liquid crystal panel 4 in the vertical direction (Y-direction) are illustrated in FIG. 15.

According to the embodiment, in the combination of the liquid crystal panel 4 and the light sources 36, the direction in which the transmittance of the liquid crystal panel 4 is high is matched with the direction in which the luminance of the light sources 36 is high, that is, the direction of the lower side of the liquid crystal panel 4 on which the light sources 36 are disposed is matched with the distinct vision direction of the liquid crystal panel 4. Thus, the strength $F_R$ of the light (reflected light) that is reflected from the light-diffusing member 7 and emitted toward the outer surface side of the light-diffusing member 7 after being emitted from the liquid crystal panel 4 toward the light-diffusing member 7 is larger than the strength $F_S$ of the light (transmitted light) that is transmitted through the light-diffusing member 7 after being emitted from the liquid crystal panel 4 toward the light-diffusing member 7, compared with the case of using a combination with a backlight having a symmetrical light distribution in the vertical direction of the liquid crystal panel 4. Consequently, the color of the mixed light of the light transmitted through the light-diffusing member 7 and the light reflected from the light-diffusing member 7 is close to the color of the light reflected from the light-diffusing member 7, and the variation in color in the distinct vision direction of the liquid crystal panel 4 is more remarkably reduced.

Accordingly, the viewing angle property in the case of disposing the light-diffusing member 7 on the outermost surface of the liquid crystal panel 4 is more effectively improved, as described above.

In addition, the variation in color in the distinct vision direction of the liquid crystal panel 4 can be reduced without adjusting the angles formed by the hollow portions 43 and light-diffusing portions 41 of the light-diffusing member 7 unlike conventional liquid crystal displays.

Second Embodiment (Liquid Crystal Display)

Figure 16:
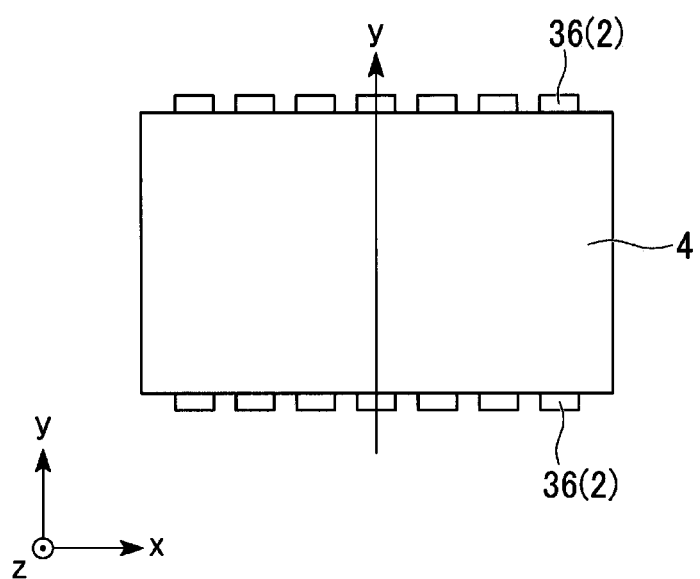
FIG. 16 is a schematic diagram illustrating the arrangement of light sources and a liquid crystal panel in a liquid crystal display according to a second embodiment of the present invention.

A liquid crystal display in which the light sources 36 are disposed on the liquid crystal panel 4 as illustrated in FIG. 16 will be described as a second embodiment of the present invention.

As illustrated in FIG. 16, in the liquid crystal display described in this embodiment, the light sources 36 are disposed on the upper and lower sides of the liquid crystal panel 4 (upper side and the lower side when the distinct vision direction is the downward direction in the case where the liquid crystal panel 4 is of a TN type).

In the case where the light sources 36 are thus disposed on the upper and lower sides of the liquid crystal panel 4, when the outputs of the light sources 36 on both sides are the same, the polar angle-luminance property of the liquid crystal panel 4 in the vertical direction (Y-direction) is symmetrical with respect to the vertical direction. However, when the outputs of the light sources 36 on the lower side are larger than the outputs of the light sources 36 on the upper side, the polar angle-luminance property of the liquid crystal panel 4 in the vertical direction (Y-direction) is asymmetrical with respect to the vertical direction. Comparing the luminance at the same polar angle, the luminance in the upward direction of the liquid crystal panel 4 is high. That is, the luminance of the liquid crystal panel 4 increases along the azimuth from the lower side to the upper side in the vertical direction thereof.

Examples of a method for making differences between the outputs of the light sources 36 disposed on the lower side of the liquid crystal panel 4 and the outputs of the light sources 36 disposed on the upper side of the liquid crystal panel 4 include a method of increasing the number of the light sources 36 disposed on the lower side of the liquid crystal panel 4, and a method of increasing an electric current caused to flow through the light sources 36 disposed on the lower side in the case where the number of the light sources 36 disposed on the lower side and the number of the light sources 36 disposed on the upper side are the same.

According to this embodiment, in the combination of the liquid crystal panel 4 and the light sources 36, the direction in which the transmittance of the liquid crystal panel 4 is high is matched with the direction in which the luminance of the light sources 36 is high (direction in which the luminance of the liquid crystal panel 4 is high). Thus, the strength $F_R$ of the light (reflected light) that is reflected from the light-diffusing member 7 and emitted toward the outer surface side of the light-diffusing member 7 after being emitted from the liquid crystal panel 4 toward the light-diffusing member 7 is larger than the strength $F_S$ of the light (transmitted light) that is transmitted through the light-diffusing member 7 after being emitted from the liquid crystal panel 4 toward the light-diffusing member 7, compared with the case of using a combination with a backlight with a symmetrical light distribution in the vertical direction of the liquid crystal panel 4. Consequently, the color of the mixed light of the light transmitted through the light-diffusing member 7 and the light reflected from the light-diffusing member 7 is close to the color of the light reflected from the light-diffusing member 7, and the variation in color in the distinct vision direction of the liquid crystal panel 4 is more remarkably reduced.

Accordingly, the viewing angle property in the case of disposing the light-diffusing member 7 on the outermost surface of the liquid crystal panel 4 is more effectively improved, as described above.

Figure 17:
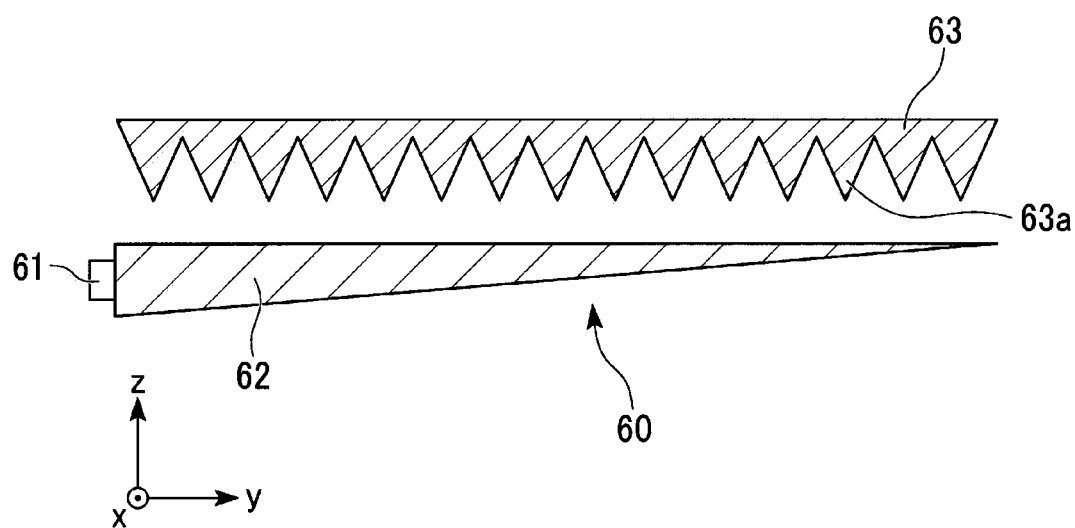
FIG. 17 is a sectional diagram illustrating a schematic structure of a backlight.

In examples described in the first embodiment and the second embodiment, as illustrated in FIG. 2, the backlight 2 is formed such that the diffusion sheet 38, the prism sheet 39, and the diffusion sheet 38 are stacked and arranged in this order on the upper surface of the light-guiding body 37, and the protruding portions 39*a* of the prism sheet 39 are continuously formed on the side of the liquid crystal panel 4. The embodiments of the present invention, however, are not limited thereto. In the embodiments of the present invention, as illustrated in FIG. 17, protruding portions 63*a* of a prism sheet 63 included in a backlight 60 may be continuously formed on the opposite side of the liquid crystal panel 4. In this case, an adjustment in the vertex angles of the protruding portions 63*a* of the prism sheet 63 enables the property (light distribution property) of emitting light from the backlight 60 toward the liquid crystal panel 4 to be asymmetrical over the entire prism sheet 63.

In the embodiments of the present invention, as illustrated in FIG. 17, the backlight 60 may include a light source 61 and a light-guiding body 62 that guides light emitted from the light source 61, and the light-guiding body 62 may have a wedge shape in which the thickness gradually decreases along the surface of the liquid crystal panel 4 on the light-incident side. The light-guiding body 62 having a wedge shape is tapered such that the thickness gradually decreases along with an increase in the distance from the surface facing the light source 61. The use of the light-guiding body 62 having such a wedge shape enables the property (light distribution property) of emitting light from the backlight 60 toward the liquid crystal panel 4 to be asymmetrical with respect to the direction in which the thickness of the light-guiding body 62 decreases. In the case of using the light-guiding body 62 having a wedge shape, the light distribution property may be caused to be asymmetrical over the entire prism sheet 63 or the light distribution property may be caused to be symmetrical over the entire prism sheet 63 in a manner in which the vertex angles of the protruding portions 63*a* of the prism sheet 63 are adjusted.

In examples described in the first embodiment and the second embodiment, the TN liquid crystal panel 4 is used. The embodiments of the present invention, however, are not limited to thereto. In the embodiments of the present invention, a VA liquid crystal panel may be used. In the case of using a VA liquid crystal panel, the direction in which a director tilts is matched with the direction in which the luminance of the light source is high (direction in which the luminance of the liquid crystal panel is high), and thus, the viewing angle property in the case of disposing the light-diffusing member on the outermost surface of the liquid crystal panel can be more effectively improved.

Third Embodiment (Liquid Crystal Display)

A liquid crystal display 100 illustrated in FIG. 18 will now be described as a third embodiment.

Figure 18:
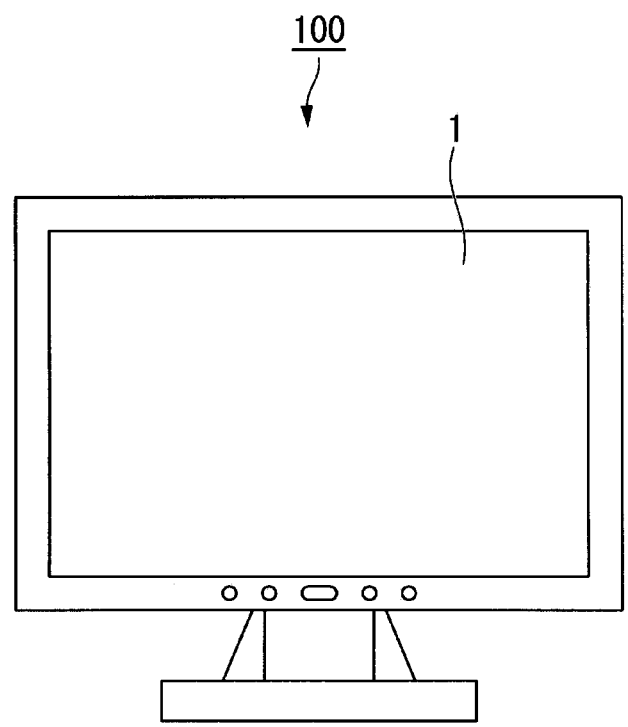
FIG. 18 is a schematic configuration view of a liquid crystal display according to a third embodiment of the present invention.

The liquid crystal display 100 illustrated in FIG. 18 is a liquid crystal television including the liquid crystal display 1 according to the first embodiment and the second embodiment and accordingly has a high image quality.

The liquid crystal display 100 according to this embodiment is not limited to such a television and may be, for example, applied to display units of a personal computer, a cellular phone, and so on.

The present invention is not necessarily limited to the first embodiment nor the second embodiment, and various modifications can be made without departing from the concept of the present invention.

Specific configurations of, for example, the size and material of each component of the light-diffusing member and manufacturing conditions in the manufacturing process are not limited to those in the first embodiment and the second embodiment and may be modified appropriately.

INDUSTRIAL APPLICABILITY

An embodiment of the present invention can be used as a liquid crystal display.

REFERENCE SIGNS LIST

1, 100 . . . liquid crystal display, 2, 60 . . . backlight, 3 . . . first polarizing plate, 4 . . . liquid crystal panel, 5 . . . second polarizing plate, 6 . . . liquid crystal display body, 7 . . . light-diffusing member, 9 . . . TFT substrate, 10 . . . color filter substrate, 11 . . . liquid crystal layer, 12 . . . spacer, 14 . . . transparent substrate, 15 . . . semiconductor layer, 16 . . . gate electrode, 17 . . . source electrode, 18 . . . drain electrode, 19 . . . TFT, 20 . . . gate insulating layer, 21 . . . first interlayer insulating layer, 22, 23, 26 . . . contact hole, 24 . . . second interlayer insulating layer, 25 . . . pixel electrode, 27, 34 . . . alignment layer, 29 . . . transparent substrate, 30 . . . black matrix, 31 . . . color filter, 32 . . . flattening layer, 33 . . . facing electrode, 36, 61 . . . light source, 37, 62 . . . light-guiding body, 38 . . . diffusion sheet, 39, 63 . . . prism sheet, 40 . . . substrate, 41 . . . light-diffusing portion, 42 . . . light-shielding layer, hollow portion, 50 . . . plane

The invention claimed is:

1. A liquid crystal display comprising:
a liquid crystal panel including a pair of substrates, a liquid crystal layer interposed between the substrates, and a pair of polarizing plates disposed on a light-incident side and a light-exit side of the liquid crystal layer;
an illumination device that is disposed on the light-incident side of the liquid crystal panel and emits light toward the liquid crystal panel; and
a light-diffusing member that is disposed on the light-exit side of the liquid crystal panel and causes light emitted from the liquid crystal panel to diffuse in an azimuth-angle direction viewed from a direction of a normal of the liquid crystal panel,
wherein the light-diffusing member includes an optically transparent base material, plural light-shielding layers formed on a surface of the optically transparent base material, and a light-diffusing portion formed in an area of the surface of the optically transparent base material other than areas in which the light-shielding layers are formed,
wherein the light-diffusing portion includes a light-exit end surface in contact with the base material, a light-incident end surface that faces the light-exit end surface and has an area larger than an area of the light-exit end surface, and a reflective surface that is in contact with the light-exit end surface and the light-incident end surface and reflects light incident on the light-incident end surface,
wherein a height of the light-diffusing portion from the light-incident end surface to the light-exit end surface is larger than a thickness of each of the light-shielding layers,
wherein there exist azimuths in which a transmittance of the liquid crystal panel and a luminance of the illumination device are higher than a transmittance and a luminance in the direction of the normal, and
wherein the azimuth in which the transmittance of the liquid crystal panel is higher coincides with the azimuth in which the luminance of the illumination device is higher.

2. The liquid crystal display according to claim 1, wherein the liquid crystal panel is of a TN type.

3. The liquid crystal display according to claim 1, wherein the liquid crystal panel is of a VA type.

4. The liquid crystal display according to claim 1, wherein a light source forming the illumination device is disposed along one side surface of the liquid crystal panel, and an azimuth from the one side surface of the liquid crystal panel to another side surface of the liquid crystal panel facing the one side surface coincides with the azimuth in which the transmittance of the liquid crystal panel is higher.

5. The liquid crystal display according to claim 1, wherein light sources forming the illumination device are disposed on one side surface of the liquid crystal panel and another side surface of the liquid crystal panel facing the one side surface, and outputs of the light sources disposed on the one side surface differ from outputs of the light sources disposed on the other side surface.

6. The liquid crystal display according to claim 5, wherein the number of the light sources disposed on the one side surface differs from the number of the light sources disposed on the other side surface.

7. The liquid crystal display according to claim 1, wherein the illumination device includes a light-guiding body that guides light emitted from the light source, and the light-guiding body is formed in a wedge shape such that a thickness of the light-guiding body gradually decreases along a surface of the liquid crystal panel on the light-incident side.

* * * * *